United States Patent [19]

Fairchild

[11] Patent Number: 5,458,679
[45] Date of Patent: Oct. 17, 1995

[54] TREATMENT OF INORGANIC FILLER MATERIAL FOR PAPER WITH POLYSACCHARIDES

[75] Inventor: George H. Fairchild, Bethlehem, Pa.

[73] Assignee: Minerals Technologies, Inc., New York, N.Y.

[21] Appl. No.: 165,221

[22] Filed: Dec. 10, 1993

[51] Int. Cl.$^6$ .................................................. C09C 1/02
[52] U.S. Cl. .................... 106/465; 106/400; 106/401; 106/416; 106/436; 106/437; 106/457
[58] Field of Search .............................. 106/465, 401, 106/400, 416, 436, 437, 457

[56] References Cited

U.S. PATENT DOCUMENTS

| | | | |
|---|---|---|---|
| 2,322,185 | 6/1943 | Bicknell et al. | 162/178 |
| 2,949,397 | 8/1960 | Werner et al. | 162/178 |
| 3,453,131 | 7/1969 | Fadner | 106/416 |
| 4,115,187 | 9/1978 | Davidson | 162/168 R |
| 4,181,567 | 1/1980 | Riddell et al. | 162/168.3 |
| 4,420,341 | 12/1983 | Ferrigno | 106/457 |
| 4,710,270 | 12/1987 | Sunden et al. | 162/175 |
| 4,755,259 | 7/1988 | Larsson | 162/178 |
| 4,799,964 | 1/1989 | Harvey et al. | 106/436 |
| 5,104,487 | 4/1992 | Taggart et al. | 162/168.3 |
| 5,152,835 | 10/1992 | Nemeh | 106/437 |
| 5,169,441 | 12/1992 | Lauzon | 106/465 |

OTHER PUBLICATIONS

Science and Technology, series of Monographs, Academic Press, N.Y., "Gum Technology in the Food Industry", by Martin Glicksman, pp. 6–9.

Derwent abstract AN 90–356393 of EP 399,775, Clare et al., "Paper size compsn. prepn.–from gum, alginate, starch, PVA or CMC and water.", Jan. 1990.

Derwent abstract AN 79–70393B; GB 2,016,498, Brooks et al., "Filler flocculating compsn. for paper making–comprising starch, organic polyelectrolyte, and agent to regulate the mobility of dispersion.", Sep. 1979.

Derwent abstract AN 75–76051W; GB 1,505,641, "Filler for replacement of fibres in paper or board–contg. cationic inorganic filler and anionic resin.", Mar. 1978.

*Primary Examiner*—Mark L. Bell
*Assistant Examiner*—Scott L. Hertzog
*Attorney, Agent, or Firm*—Pennie & Edmonds

[57] ABSTRACT

The disclosed invention relates to a composition comprising finely divided cationically charged particles of an inorganic material treated with at least one of anionic polysaccharide or anionically modified polysaccharide. The disclosed invention further relates to a method of providing paper of improved strength. The method entails providing finely divided particles of inorganic material, treating the particles with at least one of anionic polysaccharide or anionically modified polysaccharide, and adding the treated particles to cellulose fiber during an alkaline process for making paper. Also, an alkaline paper comprising the finely divided particles of inorganic material treated with at least one of anionic polysaccharide or anionically modified polysaccharide is disclosed.

16 Claims, No Drawings

TREATMENT OF INORGANIC FILLER MATERIAL FOR PAPER WITH POLYSACCHARIDES

FIELD OF THE INVENTION

This invention relates to improved filler materials for paper, and alkaline paper that includes those filler materials. This invention also relates to methods of preparing paper, particularly to methods for preparing paper using these filler materials.

BACKGROUND OF THE INVENTION

Fillers typically are added to cellulose fibers during alkaline paper making to improve brightness, opacity, show through, and feel of the formed paper. Fillers used in alkaline paper making processes typically include fine particles of inorganic materials such as clay, titanium dioxide, and calcium carbonate such as precipitated calcium carbonate ("PCC").

As much filler as possible is employed in alkaline paper because the filler not only provides improved optical properties, but also because the filler is less expensive than the pulp fiber. Additionally, increasing the amount of filler in alkaline paper making reduces energy consumption. However, increased amounts of filler may detrimentally affect the strength of the paper, both in terms of tensile strength as well as internal bond strength.

It is known to treat filler materials used in paper making to improve the strength of the paper. For example, GB 1,505,641 discloses treating particles of inorganic materials with an anionic latex of a synthetic polymeric resin. Similarly, U.S. Pat. No. 4,445,970 discloses a method of manufacturing paper containing mineral filler and anionic latex.

GB 2,016,498 discloses flocculating paper making fillers with a composition comprising starch, an organic polyelectrolyte, and an agent for moderating the degree of flocculation and viscosity of the dispersion. The resulting preflocculated filler is disclosed to provide improved tensile strength in paper.

U.S. Pat. No. 4,710,270 discloses a mineral filler covered with a dispersion of cationic starch and carboxymethylcellulose or alginate, resulting in improved strength and retention.

U.S. Pat. No. 4,799,964 discloses a preflocculated filler formed by continuously contacting a flow of an aqueous pigment slurry with a flocculating agent, followed by imparting sufficient shear force to control the particle size of the preflocculated filler. The resulting preflocculated filler is disclosed to exhibit improved retention.

U.S. Pat. No. 4,181,567 discloses contacting a mineral filler with a relatively high molecular weight homopolymer or copolymer of acrylamide to form an agglomerate which is disclosed to improve mechanical properties of the paper.

EP 399,775 discloses a film forming composition for paper comprised of a gum, a water-soluble alginate, starch, and a polyvinyl alcohol or carboxymethylcellulose. The resulting composition is disclosed as providing improved sizing and porosity control.

U.S. Pat. No. 4,420,341 discloses a stabilized surface modified filler consisting of an organic acid reactive filler, an unsaturated organic acid, an antioxidant, and a hydrocarbon liquid agent. The surface modified filler is disclosed to improve various physical properties when used in rubber and plastic compounding.

U.S. Pat. No. 2,322,185 discloses using karaya gum or alkali treated karaya gum to flocculate mineral fillers for improving retention and recovery of mineral fillers.

U.S. Pat. No. 2,949,397 discloses coating filler particles with organic colloid material derived from plant seeds or corns such as plant mucilage. An example is substituted mannans which are complex polysaccharides. The disclosed advantage is improved retention.

U.S. Pat. No. 4,755,259 discloses a process for papermaking in which a binder comprising colloidal silicic acid and either amphoteric or cationic guar gum is added to the papermaking furnish prior to sheet formation. The binder addition results in improved retention and strength.

U.S. Pat. No. 5,104,487 describes a papermaking process using a cationic starch in combination with a naturally anionic polysaccharide gum. The resulting paper or paperboard exhibits improved strength.

None of the above patents address the problem of decreased tensile strength and internal bond strength in alkaline paper products as the percent of filler in the paper is increased. None of these references, moreover, show reacting anionic or anionically modified polysaccharides with a finely divided inorganic material to obtain a filler material which provides improved strength in paper.

A need therefore exists for filler material that can be employed in alkaline paper products at increased levels but which avoids the disadvantages of the prior art.

SUMMARY OF THE INVENTION

This invention, in a first aspect, is directed to an improved filler material for paper. The filler material is a composition that includes cationic finely divided inorganic material treated with an anionic or anionically modified polysaccharide. Preferably, the inorganic material is an alkaline earth carbonate such as calcium carbonate, most preferably, precipitated calcium carbonate (PCC). The polysaccharide preferably is a gum, more preferably xanthan gum or anionic guar gum.

The invention also is directed to an improved method of alkaline paper making. The method entails providing the above finely divided particles of inorganic material, treating the particles with the polysaccharide, and adding those treated particles to cellulose fiber during an alkaline paper making process.

Another aspect of the invention relates to an improved alkaline paper. The alkaline paper comprises the above finely divided particles of inorganic material treated with the above anionic or anionically modified polysaccharide.

DETAILED DESCRIPTION OF THE INVENTION

In the present invention, the strength of the paper surprisingly can be increased by selecting and treating the inorganic material with an anionic polysaccharide or an anionically modified polysaccharide, and adding the treated material to cellulose fiber during an alkaline paper making process. Other uses of the filler material of the invention include use as pigments and fillers in cements, plastics, rubber, paints and pharmaceuticals.

Generally, the fillers of the invention are obtained by mixing finely divided particles of inorganic material with an anionic or anionically modified polysaccharide. Preferably, the polysaccharides employed have a number average molecular weight of from about $1\times10^4$ to about $5.0\times10^7$.

Polysaccharides useful in the invention may be classified by solubility, source, structure, etc. Polysaccharides useful in the invention and which are classified on the basis of solubility include agar, algins, carboxymethylcellulose, carrageenans, anionic guar gum, gum arabic, hemicellulose, xanthan and the like. Polysaccharides useful in the invention and which are classified on the basis of source include seed gums such as corn starch, anionic guar gum, and the like; tuber and root gums such as potato starch and the like; seaweed extracts such as algins, carrageenans, agar and the like; exudate gums such as gum arabic, gum tragacanth, gum ghatti, gum karaya and the like; fermentation gums such as xanthan, gellan, and the like; and derived gums such as carboxymethylcellulose, starch acetates, starch phosphates, starch sulfates and the like. Other useful polysaccharides include anionic polysaccharides such as algins, xanthan, carboxymethylcellulose, gum arabic, carrageenans, agar, gellan gum and the like.

Polysaccharides especially useful in the invention include but are not limited to algin, xanthan gum, anionic guar gum, carboxymethylcellulose, gum arabic, carrageenans, agar, gellan gum and the like, preferably xanthan gum and anionic guar gum.

The inorganic material employed in the invention may be any inorganic material having a net cationic charge which is typically used as a filler in paper making. Useful inorganic materials include minerals such as calcium carbonate, clay, titanium dioxide, talc, alumina trihydrate, sodium aluminosilicate, zinc sulfide and the like. Calcium carbonate may be either natural, such as ground limestone and chalk, or precipitated. Most preferred is precipitated calcium carbonate.

The average particle size of the inorganic material useful in the invention typically is from about 0.1 to about 5 μ, preferably from about 0.2 to about 3.0 μ. Average particle size is defined as the equivalent spherical diameter as measured by a Sedigraph 5100, manufactured by Micrometrics Co. The particles of inorganic material can be treated with polysaccharide to provide about 0.01 to about 5% of polysaccharide based on dry weight of inorganic material, preferably from about 0.05 to about 0.5% of polysaccharide based on dry weight of inorganic material.

The inorganic materials of the invention can be treated with polysaccharides by any of Method (A), Method (B), Method (C), or Method (D) as described below. In Method (A), dry powder of polysaccharide such as anionic or anionically modified polysaccharide is added to an aqueous slurry that has about 5 to about 75% by weight, preferably about 10 to about 30% by weight of inorganic material solids in the aqueous phase. Dry polysaccharide is added to the aqueous slurry of inorganic material to provide about 0.01 to 5% of polysaccharide based on the weight of inorganic material, preferably about 0.05 to 0.5% of polysaccharide based on the weight of inorganic material. An aqueous slurry of inorganic material and polysaccharide are mixed from about 1 minute to about 6 hours, preferably from about 15 minutes to about 3 hours. The temperature of mixing is typically from about 5° C. to about 95° C., preferably about 20° C. to about 60° C.

In Method (B), an aqueous solution of anionic or anionically modified polysaccharide is added to an aqueous slurry of inorganic material that has about 5 to 75% by weight, preferably about 10 to 30% by weight, most preferably about 20% by weight of inorganic material solids in the aqueous phase. The finely divided inorganic material and polysaccharide are mixed from about 1 minute to about 6 hours, preferably from about 15 minutes to about 3 hours. The temperature of mixing is typically from about 5° C. to about 95° C., preferably about 20° C. to about 60° C. The solution of polysaccharide can have concentrations of about 0.1 to about 5.0%, preferably from about 1 to about 2%. A sufficient amount of polysaccharide is employed to provide about 0.01 to 5% of polysaccharide based on the weight of inorganic material, preferably about 0.05 to 0.5% of polysaccharide based on the weight of inorganic material.

In Method (C), finely divided dry particles of inorganic materials such as dolomite and calcium carbonate are added to the aqueous solution of polysaccharide. The finely divided inorganic material and solution of polysaccharide are mixed from about 1 minute to about 6 hours, preferably from about 15 minutes to about 3 hours. The temperature of mixing is typically from about 5° C. to about 95° C., preferably about 20° C. to about 60° C. The inorganic material is treated with the aqueous solution of polysaccharide to provide about 0.01 to about 5% of polysaccharide based on the weight of inorganic material, preferably about 0.05 to about 0.5% of polysaccharide based on the weight of inorganic material.

In Method (D), the inorganic filler material is treated with polysaccharides by independently adding dry powder of polysaccharide and dry powder of the finely divided inorganic material to water. In this method, polysaccharide is added to water to provide about 0.01 to about 5% of polysaccharide based on the weight of inorganic material, preferably about 0.05 to about 0.5% of polysaccharide based on the weight of inorganic material. The finely divided inorganic material and polysaccharide are mixed from about 1 minute to about 6 hours, preferably from about 15 minutes to about 3 hours. The temperature of mixing is typically from about 5° C. to about 95° C., preferably about 20° C. to about 60° C.

The alkaline paper of the invention comprises cellulosic fiber and finely divided particles of inorganic material treated with polysaccharide. The polysaccharide and the finely divided particles of inorganic material are as discussed above.

The foregoing and other objects, features, aspects and advantages of the present invention will become more apparent from the following non-limiting examples of the present invention.

EXAMPLES 1–1H

In examples 1–1H, the effects on paper strength due to use of a filler of PCC treated with anionic or anionically modified polysaccharides are compared. The treated PCC filler is prepared by mixing 1% aqueous solution of polysaccharide with an aqueous slurry of 20% PCC solids as in method (B). The amount of aqueous solution of polysaccharide is sufficient to provide 0.3% of polysaccharide by weight of dry PCC. The treated PCC filler is added to a pulp furnish, formed into handsheets, and evaluated for strength. As a control, untreated PCC filler is employed in the pulp furnish. The PCC has scalenohedral morphology, an average particle size of 1.4 microns, and a specific surface area of 11.3 m²/g.

The compositions in Table 1 are formed into handsheets of paper (60 g/m²) using a Formax Sheet Former (Noble and Wood type, from Adirondack Machine Corp) from a furnish of 75% bleached hardwood and 25% bleached softwood Kraft pulps beaten to 400 Canadian Standard Freeness (CSF) at pH 7 in distilled water.

Pulp consistency is 0.3125. A retention aid (high molecular weight cationic polyacrylamide) Percol from Allied Colloids is added to the pulp furnish at a level of 0.05% (1 lb./ton of paper). Synthetic sizing agent (alkyl ketene dimer) is added to the pulp furnish at a level of 0.25% (5 lbs/ton of paper). The sheets are conditioned at 50% relative humidity and 23° C. prior to testing.

TABLE 1

| Example No. | % PCC Filler in Pulp Furnish | Breaking Length[1] | Scott Bond[2] |
|---|---|---|---|
| 1  | 14.25[3] | 1.994 km | 44.75 |
| 1A | 21.84[3] | 1.673 | 36.75 |
| 1B | 28.81[3] | 1.292 | 27.85 |
| 1C | 13.99[4] | 2.174 | 48.5 |
| 1D | 21.44[4] | 1.727 | 39.5 |
| 1E | 28.28[4] | 1.385 | 30.75 |
| 1F | 14.93[5] | 1.764 | 40 |
| 1G | 22.54[5] | 1.364 | 31.5 |
| 1H | 28.14[5] | 1.106 | 23.75 |

[1] TAPPI Test Method T494 OM-88
[2] TAPPI Test Method UM 403
[3] PCC having treatment level of 0.3% Xanthan Gum
[4] PCC having treatment level of 0.3% anionic Guar Gum
[5] Untreated PCC The strength of the paper which contains the treated filler in accordance with the invention surprisingly is greater than that of paper containing an equivalent amount of untreated filler.

EXAMPLES 2–2(G)

Examples 2–2(G) illustrate the effects on paper strength due to use of increasing amounts of PCC filler treated with xanthan gum. The PCC has scalenohedral morphology, an average particle size of 1.4 microns, and a specific surface area of 12.3 m$^2$/g. In Examples 2–2(E), PCC filler is treated as in Method (B) with a 1% aqueous solution of xanthan gum to provide varying amounts of xanthan gum by dry weight of PCC. For comparison, untreated PCC filler is employed in examples 2(F) and 2(G).

Handsheets that employ various loadings of the treated and untreated PCC fillers are formed and tested as in Example 1. The amount of xanthan gum in the treated PCC filler, and the effect on paper strength due to incorporating the treated filler, as well as untreated filler, in the pulp furnish is provided in Table 2.

TABLE 2

| Example No. | % PCC Filler in Pulp Furnish | % Xanthan Gum in PCC Filler | Breaking Length[1] | Scott Bond[2] |
|---|---|---|---|---|
| 2  | 15.60 | 0.05 | 2.192 km | 59.33 |
| 2A | 28.90 | 0.05 | 1.506 | 41.00 |
| 2B | 15.17 | 0.20 | 2.395 | 67.00 |
| 2C | 29.11 | 0.20 | 1.489 | 40.00 |
| 2D | 15.74 | 0.40 | 2.507 | 74.66 |
| 2E | 29.36 | 0.40 | 1.622 | 44.66 |
| 2F | 14.86 | 0.00 | 2.034 | 51.33 |
| 2G | 30.13 | 0.00 | 1.212 | 34.33 |

[1] TAPPI Test Method T494 OM-88
[2] TAPPI Test Method UM 403

EXAMPLES 3–3(E)

In examples 3–3(E), the paper strength achieved due to adding PCC filler treated with xanthan gum to a pulp furnish is compared with paper strength achieved by separately adding PCC filler and xanthan gum to the pulp furnish, as well as to paper strength achieved by adding untreated PCC to the pulp furnish. The PCC has a scalenohedral morphology, average particle size of 1.3 microns, and a specific surface area of 12.1 m$^2$/g.

The treated PCC filler is made by adding an amount of 1% aqueous solution of xanthan gum to an aqueous 20% solids slurry of PCC as in method (A) to attain a treatment level of 0.5% xanthan gum based on the dry weight of PCC. In examples 3–3(A), handsheets are prepared from the pulp furnish as in example 1 except that the filler levels of treated PCC in the pulp furnish are as shown in Table 3.

In examples 3(B)–3(C), handsheets are prepared and tested as in example 1 except that an aqueous 20% solids slurry of untreated PCC is added to the pulp furnish. In examples 3(D)–3(E), handsheets are also prepared from the pulp furnish as in example 1 except that an aqueous 20% solids slurry of untreated PCC and the 1% aqueous solution of xanthan gum each are separately added to the pulp furnish. The amount of the 1% aqueous solution of xanthan gum employed is sufficient to attain a PCC filler that has a treatment level of 0.5% xanthan gum. The amount of PCC filler in the pulp furnish employed is shown in Table 3.

The effects on strength are shown in Table 3.

TABLE 3

| Ex. No. | 0.5% Xanthan gum treated PCC in Pulp Furnish (%) | % untreated PCC added to Pulp Furnish | 1.0% Xanthan Gum added to Pulp Furnish | Breaking Length[2] | Scott Bond[3] |
|---|---|---|---|---|---|
| 3  | 15.09 | — | — | 2.199 km | 50.66 |
| 3A | 25.12 | — | — | 1.597 | 35.33 |
| 3B | — | 14.72 | — | 2.129 | 43 |
| 3C | — | 24.69 | — | 1.337 | 25.66 |
| 3D | — | 14.58 | Amount[1] | 2.086 | 45.66 |
| 3E | — | 24.48 | Amount[1] | 1.41 | 29.66 |

[1] Amount added is sufficient to generate treated PCC having a treatment level of 0.5% Xanthan gum
[2] TAPPI Test Method T494 OM-88
[3] TAPPI Test Method UM 403

EXAMPLES 4–4(G)

In examples 4–4(G), the effect of the morphology of the PCC filler on paper strength is evaluated. The PCCs employed have either prismatic or rhombohedral morphology.

PCC with a prismatic morphology used in this example has an average particle size of 2.2 microns and a specific surface area of 3.6 m$^2$/g. PCC with a rhombohedral morphology used in this example has an average particle size of 3.3 microns and a specific surface area of 2.5 m$^2$/g. An aqueous slurry of 20% solids of each of these PCC(s) is treated with a 1% aqueous solution of xanthan gum in an amount sufficient to provide 0.5% of xanthan gum based on the dry weight of PCC as in method (B). For comparison, aqueous slurries of 20% solids of untreated PCC(s) of rhombohedral and prismatic morphologies are evaluated.

Handsheets of the treated and untreated PCC fillers are prepared and tested as described in Example 1 except that the filler levels employed are as given in Table 4. The results are shown in Table 4.

TABLE 4

| Ex. No. | % treated Rhombohedral PCC in pulp furnish | % untreated Rhombohedral PCC in pulp furnish | % treated Prismatic PCC in pulp furnish | % untreated Prismatic PCC in pulp furnish | Breaking Length[1] | Scott Bond[2] |
|---|---|---|---|---|---|---|
| 4  | 15.14 | —     | —     | —     | 2.604 | 57.66 |
| 4A | 24.01 | —     | —     | —     | 2.100 | 49.33 |
| 4B | —     | 15.80 | —     | —     | 2.217 | 50.33 |
| 4C | —     | 24.69 | —     | —     | 1.676 | 39.00 |
| 4D | —     | —     | 15.33 | —     | 2.869 | 62.66 |
| 4E | —     | —     | 24.02 | —     | 2.155 | 45.00 |
| 4F | —     | —     | —     | 15.31 | 2.381 | 48.33 |
| 4G | —     | —     | —     | 24.65 | 1.853 | 39.33 |

[1] TAPPI Test Method TM494 OM-88
[2] TAPPI Test Method UM 403

The results in Table 4 show that various PCC morphologies can be treated with polysaccharides such as xanthan gum to achieve improved paper strength.

EXAMPLE 5–5(E)

In examples 5–5(E), PCC filler is treated with polysaccharide at various temperatures. These fillers are incorporated into a pulp furnish, formed into sheets and tested as in example 1. The effects of these fillers on paper strength is evaluated.

The PCC employed has scalenohedral morphology, an average particle size of 1.3 microns, and a specific surface area of 12.1 $m^2/g$. An aqueous 20% solids slurry of the PCC is treated at 25° C. with a 1% aqueous solution of xanthan gum as described in Example 1 to provide treated PCC having 0.3% xanthan gum based on the dry weight of the PCC. For comparison, a second aqueous 20% solids slurry of the above PCC is heated to 60° C. prior to addition of the 1% solution of xanthan gum and maintained at 60° C. for 30 minutes. The amount of the xanthan gum solution is employed in an amount sufficient to provide 0.3% xanthan gum based on the dry weight of the PCC.

Handsheets are prepared as described in Example 1 except that the amounts of the treated PCC employed in the pulp furnish are as given in Table 5. The results are shown in Table 5.

TABLE 5

| Ex. No. | % PCC having 0.3% Xanthan gum treated at 25° C. in pulp furnish | % PCC having 0.3% Xanthan gum treated at 60° C. in pulp furnish | % untreated PCC in Pulp furnish | Breaking Length[1] | Scott Bond[2] |
|---|---|---|---|---|---|
| 5  | 12.95 | —     | —     | 1.893 | 31.58 |
| 5A | 22.06 | —     | —     | 1.302 | 21.75 |
| 5B | —     | 13.67 | —     | 2.027 | 36.25 |
| 5C | —     | 22.71 | —     | 1.378 | 28.00 |
| 5D | —     | —     | 13.39 | 1.627 | 30.00 |
| 5E | —     | —     | 23.23 | 0.911 | 14.25 |

[1] TAPPI Test Method T494 OM-88
[2] TAPPI Test Method UM 403

The results in Table 5 show that increasing the temperature at which the PCC filler is treated with polysaccharide provides additional strength improvements.

Although the present invention has been described in detail, it is clearly understood that the same is by way of example only and is not to be taken by way of limitation, the scope of the invention being limited only by the scope of the appended claims.

What is claimed is:

1. A filler material comprising at least one cationically charged inorganic material treated with at least one of anionic polysaccharide or anionically modified polysaccharide.

2. The filler material of claim 1 wherein the inorganic material is an alkaline earth carbonate.

3. The filler material of claim 1 wherein the alkaline earth carbonate is calcium carbonate.

4. The filler material of claim 2 wherein the polysaccharide is selected from the group consisting of algin, xanthan gum, carboxymethylcellulose, gum arabic, carrageenans, agar, gellan gum and mixtures thereof.

5. The filler material of claim 2 wherein the polysaccharide is a gum.

6. The filler material of claim 5 wherein the gum is selected from group consisting of xanthan gum and anionic guar gum.

7. The filler material of claim 5 wherein the polysaccharide has a molecular weight of from about $1\times10^4$ to about $2\times10^7$.

8. The filler material of claim 5 wherein the polysaccharide has a molecular weight of from about $1\times10^6$ to about $2\times10^6$.

9. The composition of claim 1 wherein the average particle size of the inorganic material is between about 0.1 to 5 μ.

10. The composition of claim 1 wherein the polysaccharide is present in an amount of about 0.01 to 5% by weight of the dry weight of the inorganic material.

11. The composition of claim 10 wherein the average particle size of the inorganic material is between about 0.02 and 3 μ.

12. The composition of claim 11 wherein the polysaccharide is present in an amount of about 0.05 to 0.5% by weight of the dry weight of the inorganic material.

13. The composition of claim 1 wherein the inorganic material is calcium carbonate, clay, titanium dioxide, talc, aluminum trihydrate, an aluminosilicate, or a sulfide.

14. The composition of claim 1 wherein the polysaccharide is algin, xanthan gum, anionic guar gum, carboxymethylcellulose, gum arabic, carrageenan, agar, gellan gum or mixtures thereof.

15. The composition of claim 11 wherein the inorganic material is an alkaline earth carbonate and the polysaccharide is a gum.

16. The composition of claim 11 wherein the inorganic material is precipitated calcium carbonate and the polysaccharide is xanthan gum or anionic guar gum.

* * * * *